(12) United States Patent
Nordahl

(10) Patent No.: US 8,970,502 B2
(45) Date of Patent: Mar. 3, 2015

(54) USER IDENTIFICATION FOR MULTI-USER TOUCH SCREENS

(75) Inventor: Mats Nordahl, Göteborg (SE)

(73) Assignee: Touchtable AB, Askim (SE)

( * ) Notice: Subject to any disclaimer, the term of this patent is extended or adjusted under 35 U.S.C. 154(b) by 820 days.

(21) Appl. No.: 11/797,906

(22) Filed: May 8, 2007

(65) Prior Publication Data

US 2007/0273670 A1    Nov. 29, 2007

Related U.S. Application Data

(60) Provisional application No. 60/808,550, filed on May 26, 2006.

(51) Int. Cl.
*G06F 3/041* (2006.01)

(52) U.S. Cl.
CPC .................................. *G06F 3/0416* (2013.01)
USPC .......................... 345/173; 178/18.04; 463/37

(58) Field of Classification Search
CPC ................... G06F 3/0416; G06F 2203/04104; G06F 3/011; G06F 3/038; G06F 2203/04106
USPC ............................ 345/173; 463/37; 178/18.04
See application file for complete search history.

(56) References Cited

U.S. PATENT DOCUMENTS

| | | | |
|---|---|---|---|
| 5,986,224 A | 11/1999 | Kent | |
| 6,498,590 B1 * | 12/2002 | Dietz et al. | 343/893 |
| 6,545,669 B1 * | 4/2003 | Kinawi et al. | 345/173 |
| 6,549,195 B2 * | 4/2003 | Hikida et al. | 345/173 |
| 6,856,259 B1 * | 2/2005 | Sharp | 341/5 |
| 7,084,859 B1 * | 8/2006 | Pryor | 345/173 |
| 2002/0185981 A1 | 12/2002 | Dietz et al. | |
| 2003/0067447 A1 * | 4/2003 | Geaghan et al. | 345/173 |
| 2006/0022959 A1 * | 2/2006 | Geaghan | 345/173 |
| 2006/0028453 A1 * | 2/2006 | Kawabe | 345/173 |
| 2006/0220788 A1 * | 10/2006 | Dietz et al. | 340/5.74 |
| 2007/0265745 A1 * | 11/2007 | Styles et al. | 701/36 |

FOREIGN PATENT DOCUMENTS

| | | |
|---|---|---|
| JP | 2000-148396 | 5/2000 |
| WO | WO 03/007227 | 1/2003 |

* cited by examiner

*Primary Examiner* — William Boddie
*Assistant Examiner* — Sahlu Okebato
(74) *Attorney, Agent, or Firm* — Harness, Dickey & Pierce, P.L.C.

(57) ABSTRACT

The invention relates to a touch screen system with a touch screen (400) comprising a transparent and electrically conductive surface (450) arranged to receive touches from users (UA, UB) of the touch screen system; and touch sensitive elements (420) arranged to detect the position of said touches on said electrically conductive surface (450). The touch screen system is further comprising a touch identification system (900) comprising at least two electrodes (EA-ED), at least one transmitting unit (910) connected to the electrically conductive surface (450) for transmitting an identifying signal to said electrically conductive surface (450), and at least two receiving units (900A-900D), each connected to at least one of said electrodes (EA-ED) for detecting said identifying signal when a user (UA, UB) simultaneously touches the electrically conductive surface (450) and an electrode (EA-ED) that is connected to the receiving unit (900A-900D).

17 Claims, 8 Drawing Sheets

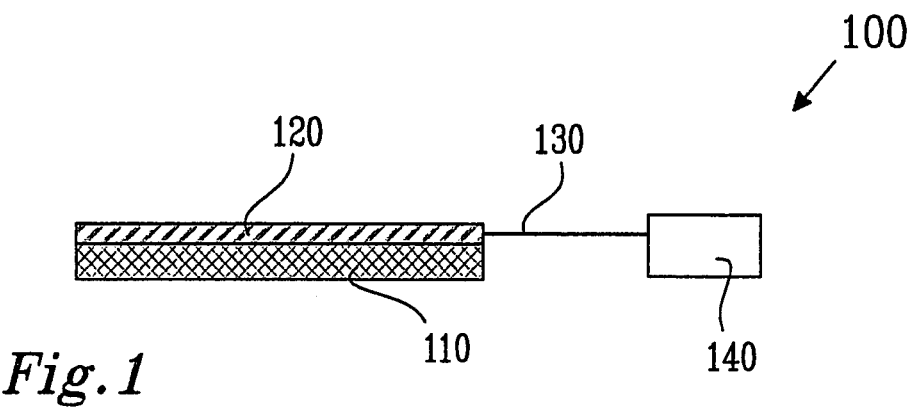
*Fig.1*
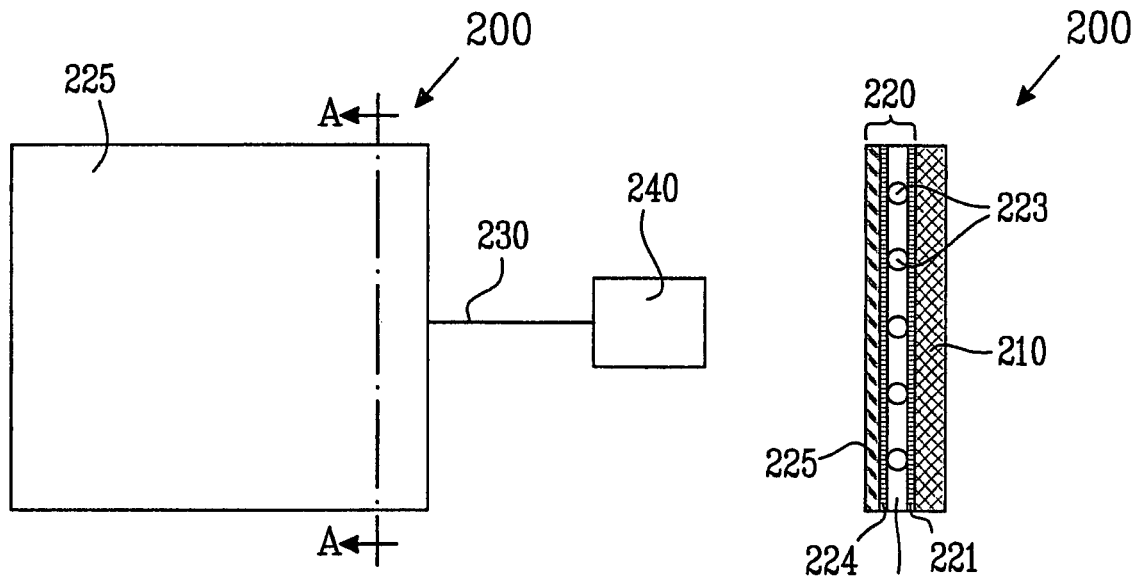
*Fig.2a*
*Fig.2b*

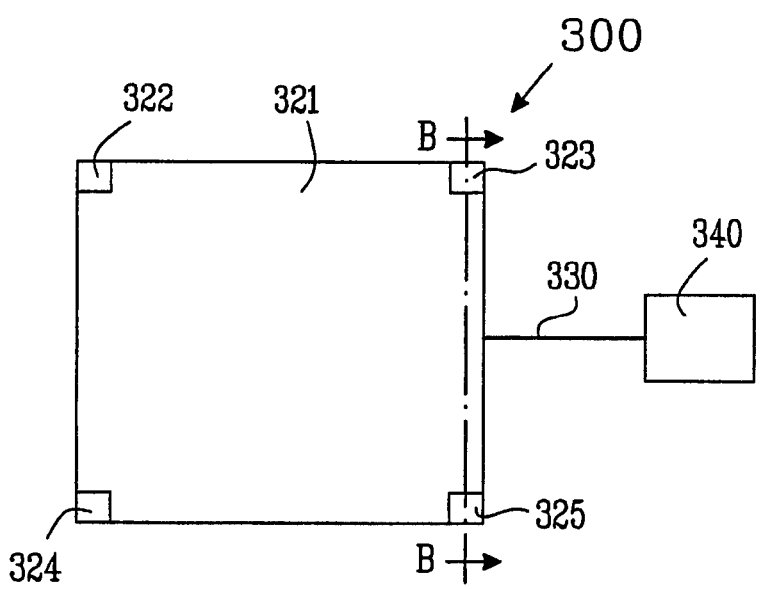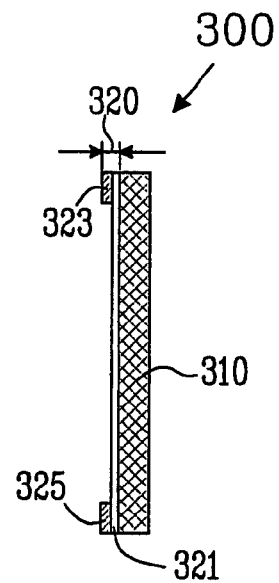
*Fig.3a*      *Fig.3b*
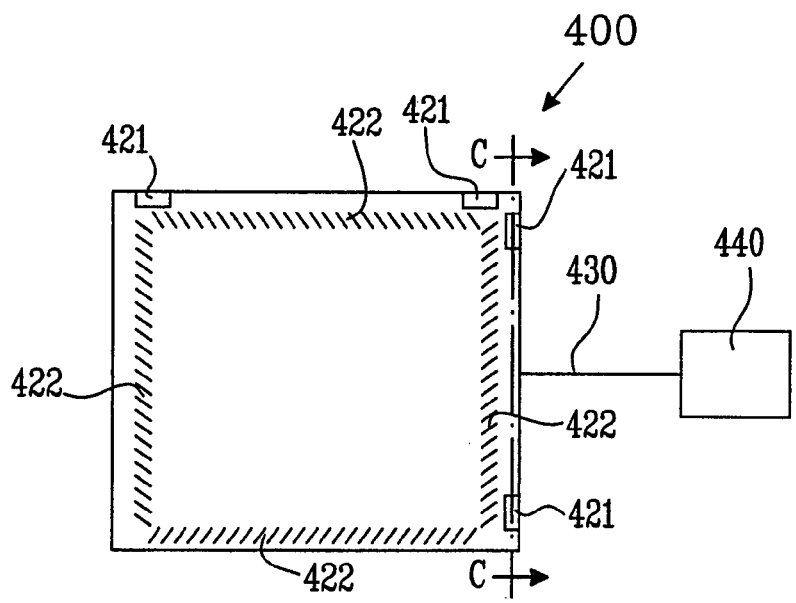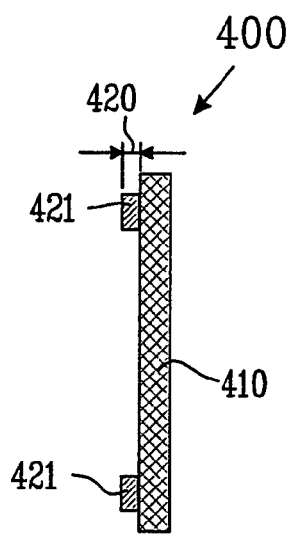
*Fig.4a*      *Fig.4b*

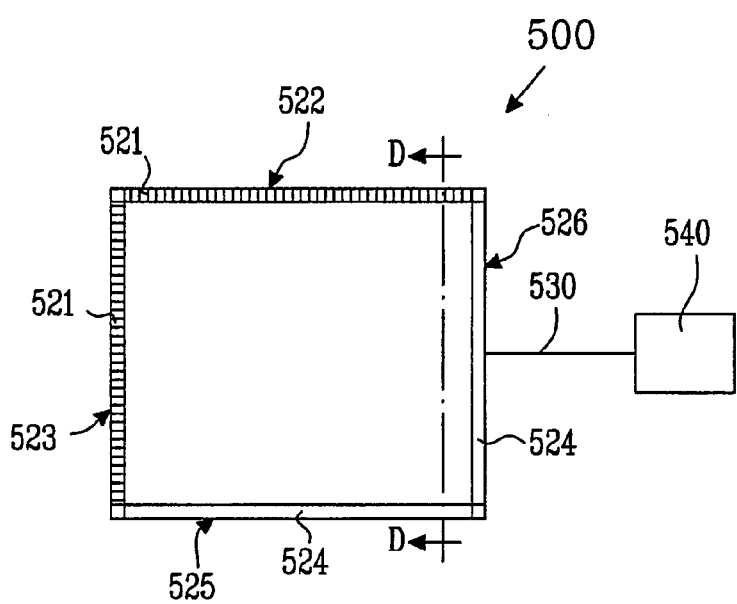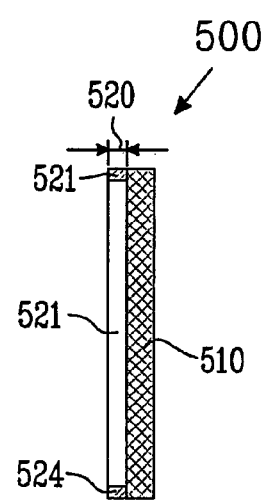
Fig.5a
Fig.5b

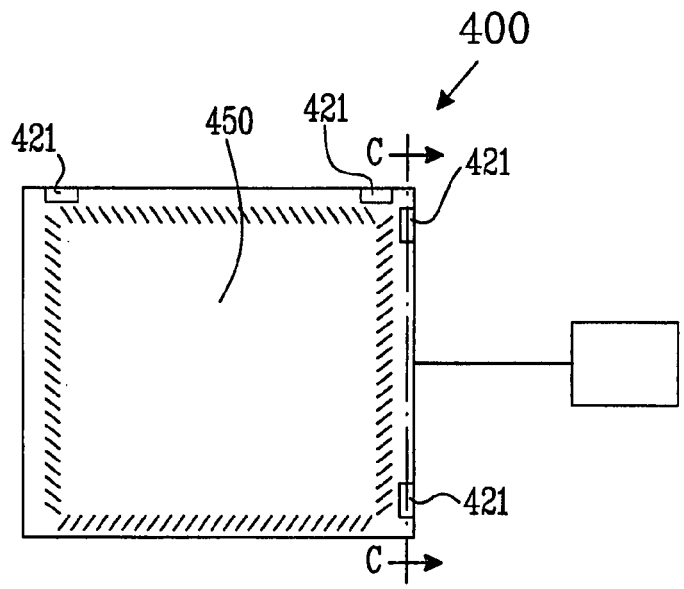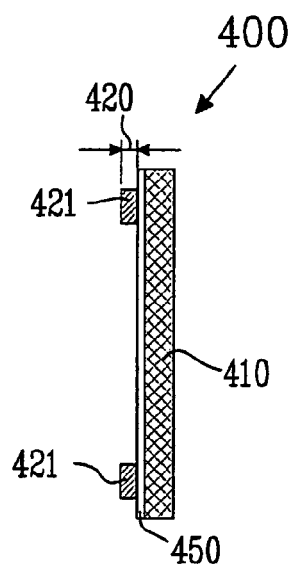
*Fig.6a* *Fig.6b*
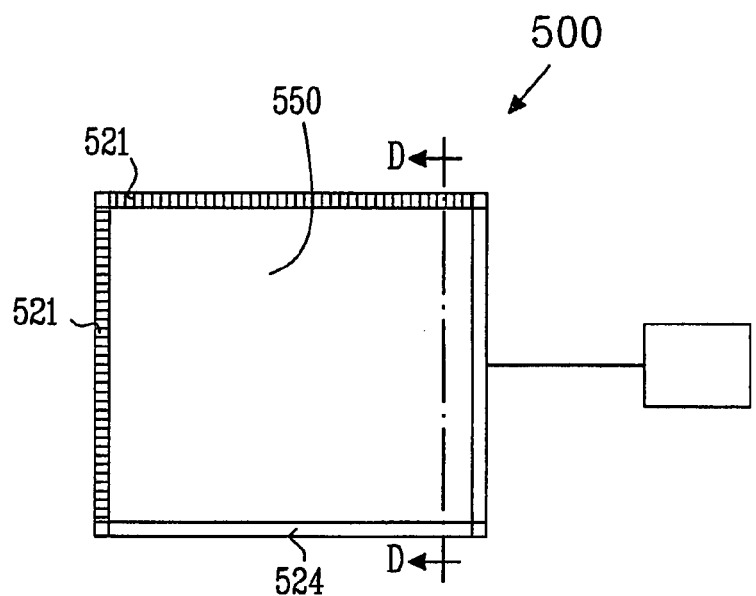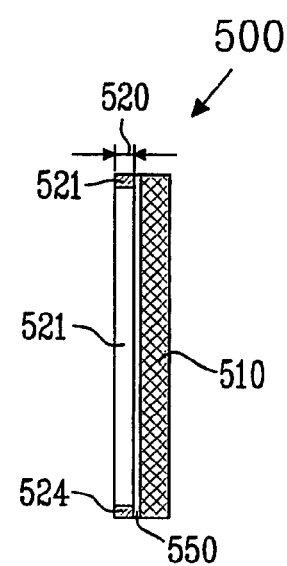
*Fig.7a* *Fig.7b*

USER IDENTIFICATION FOR MULTI-USER TOUCH SCREENS

PRIORITY STATEMENT

This application claims benefit of priority under 35 U.S.C. §119 from Provisional Application No. 60/808,550 filed on May 26, 2006, in the United States Patent Office, the disclosure of which is incorporated herein by reference in its entirety.

FIELD OF THE INVENTION

The invention relates in general to a touch screen system and in particular to a touch sensitive screen that is arranged to be used simultaneously by a plurality of users.

BACKGROUND OF THE INVENTION

Touch screens and touch screen systems in general are well known in the technology of today. They are frequently used in a vast variety of applications, including for example automated teller machines (ATM) and industrial processing machines. Touch screens and touch screen systems are in particular used to replace or supplement conventional input systems such as the keyboard and/or mouse of a computer or similar.

A touch on a touch screen in an ordinary touch screen system causes the system to calculate the X and Y coordinates of the touch. The coordinates are typically calculated by a personal computer (PC) or some other suitable control unit connected to the touch screen.

The touch screen of an ordinary touch screen system is typically arranged on the surface of a display unit, e.g. on the surface of a CRT screen, a plasma screen or a LCD screen, or on the surface of some other suitable screen or similar that can be used for displaying images and/or other information.

In applications where the touch screen is arranged on the surface of a display unit it is common to connect both the touch screen and the display unit to the same computer or control unit, or alternatively to connect the computer(s) and/or the control unit(s) to each other in case the touch screen and the display unit is connected to separate computers or units. This will enable the computer or control unit to correlate the X and Y coordinates of the touch with an image displayed on the display unit so as to detect and recognise the touch of a certain object in the displayed image. This is a common and well known touch system technique that needs no further explanation.

A variety of well known touch-sensing technologies are commonly applied in connection with touch screen systems, including e.g. acoustic, resistive, capacitive and infrared technologies. These technologies are traditionally implemented to detect a sequence of touches that occur one at the time, i.e. they are in many cases unable to distinguish one touch from another, especially if the touches occur simultaneously.

However, improvements have been made, which enable a detection and resolving of several overlapping touches, e.g. by means of sampling techniques utilizing the fact that two touches are rarely occurring exactly simultaneously and/or the fact that two touches are usually made by different forces and/or occupies smaller or larger areas of the touch screen, see e.g. the U.S. Pat. No. 6,856,259.

However, even if several touches occurring substantially simultaneously can be distinguished from each other to some extent, known touch screen technologies cannot distinguish a touch made by a first user from a touch made by a second user, i.e. known touch screen systems treat all touches as originating from a single user, or alternatively from an unknown user.

This is a clear disadvantage in applications where a touch screen or a touch screen system is simultaneously used by a plurality of users, which may be the case e.g. in game play and gambling applications, or in connection with collaboration in office environments, or in collaboration in a command centre, e.g. for military operations or disaster relief etc.

Consequently, there is a need for an improved touch screen and touch screen system that enables a touch on the touch sensitive screen to be associated with a certain user of the touch screen and the touch screen system.

SUMMARY OF THE INVENTION

The present invention provides for user identification in connection with a multi-user touch screen system comprising a touch screen having a transparent and electrically conductive surface arranged to receive touches from users of the touch screen system. Said touch screen is further provided with touch sensitive elements arranged to detect touches on said surface and at least one control unit connected to said touch sensitive elements and arranged so as to detect the position of the touches detected by said touch sensitive elements, The electrically conductive surface may e.g. be a conductive layer formed on a substrate or simply the surface of a transparent and electrically conductive substrate.

In particular, the present invention provides for a a multi-user touch screen system having a touch identification system by means of which a touch on the touch sensitive screen of the touch screen system can be associated with a certain user of the touch screen system.

The touch identification system comprises:
at least two electrodes;
at least one transmitting unit for transmitting an identifying signal;
at least one receiving unit for detecting at least one identifying signal;
wherein said at least one transmitting unit and said at least one receiving unit are arranged with respect to said electrically conductive surface and said at least two electrodes so that at least one receiving unit detects an unique identifying signal from at least one transmitting unit when a user simultaneously touches the electrically conductive surface and an electrode connected to the receiving unit.

An embodiment of the invention has a a multi-user touch identification system wherein:
said at least one transmitting unit is connected to the electrically conductive surface for transmitting an identifying signal to said electrically conductive surface, and
said at least two receiving units are each connected to at least one of said electrodes for detecting said identifying signal when a user simultaneously touches the electrically conductive surface and an electrode connected to the receiving unit.

In other words, in this embodiment each receiving unit is preferably connected to at least one of said electrodes for detecting said identifying signal when a user of the touch screen system simultaneously touches the electrically conductive surface and an electrode that is connected to the receiving unit. It is preferred that one receiving unit is connected to each electrode, though other embodiments may have two or more receiving units connected to one electrode and/or two or more electrodes connected to one receiving unit.

Another embodiment of the invention has a a multi-user touch screen system wherein:

said at least two transmitting units are each connected to at least one of said electrodes for transmitting a unique identifying signal to the electrode, and said at least one receiving unit connected to the electrically conductive surface for detecting an unique identifying signal from a transmitting unit when a user simultaneously touches an electrode connected to the transmitting unit and the electrically conductive surface.

In other words, in this embodiment the receiver is capable of detecting all the unique identifying signals from the transmitting units, but will only detect the unique signal or signals that is actually transmitted when a user or users simultaneously touches an electrode connected to a certain transmitting unit and the electrically conductive surface.

It is also preferred that the control unit of the multi-user touch screen system is further connected to the touch identification system for associating; the position of a touch from a certain user detected by said touch screen with an identifying signal from said user detected by said touch identification system.

Said association is preferably performed depending on at least one of:

the timing of said positions detected by said multi-user touch screen and said identifying signals detected by said multi-user touch identification system;

the magnitude of said touches detected by said multi-user touch screen and said touch identification system;

the position detected by said multi-user touch screen and a position detected by said touch identification system provided with an electrically conductive surface divided into sub-areas being electrically insulated with respect to each other, and each being connected to a transmitter adapted to transmit an unique signal to be detected by a detector; or each being connected to a receiver being adapted to receive and detect a plurality of unique identifying signals.

Moreover, it is preferred that the multi-user touch screen system comprises a transparent substrate, wherein the transparent and electrically conductive surface is formed on the surface of said substrate.

In addition, it is preferred that the multi-user touch screen system comprises a display unit arranged beneath the transparent and electrically conductive surface for presenting moving images to be observed by an user of said touch screen system.

Furthermore, it is preferred that the multi-user touch screen system has a transparent and electrically conductive surface made of an electrically conductive metal oxide or polymer.

It is also preferred that the multi-user touch screen system has the touch sensitive elements arranged on -the transparent and electrically conductive surface.

It is likewise preferred that the multi-user touch screen system comprises a touch screen that is a resistive touch screen having resistive touch sensitive elements (220), or a capacitive touch screen having capacitive touch sensitive elements, or a SAW touch screen having acoustic touch sensitive elements or an IR touch screen having infrared touch sensitive elements.

Moreover, it is preferred that the receiver of the multi-user touch screen system is arranged to detect at least one of: a voltage, a current, a frequency or an amplitude that is received from a transmitter via the body of a user of said touch screen system.

The invention also provides for a touch table arrangement comprising a table top provided with a multi-user touch screen system as described above.

Further advantages of the present invention and embodiments thereof will appear from the following detailed description of the invention.

BRIEF DESCRIPTION OF THE DRAWINGS

FIG. 1 is a schematic side view of a typical touch screen 100;

FIG. 2a is a schematic top view of a resistive touch screen 200;

FIG. 2b is a schematic cross section of the resistive touch screen 200 along the section line A-A in FIG. 2a;

FIG. 3a is a schematic top view of a capacitive sensing touch screen 300;

FIG. 3b is a schematic cross section of the capacitive touch screen 300 along the section line B-B in FIG. 3a;

FIG. 4a is a schematic top view of a surface acoustic wave (SAW) touch screen 400;

FIG. 4b is a schematic cross section of the surface acoustic wave (SAW) touch screen 400 along the section line C-C in FIG. 4a;

FIG. 5a is a schematic top view of an IR touch screen 500;

FIG. 5b is a schematic cross section of the IR touch screen 500 along the section line D-D in FIG. 5a;

FIG. 6a is the SAW touch screen 400 in FIG. 4a provided with an electrically conductive surface layer 450;

FIG. 6b is the SAW touch screen 400 in FIG. 4b provided with an electrically conductive surface layer 450;

FIG. 7a is the IR touch screen 500 in FIG. 5a provided with an electrically conductive surface layer 550;

FIG. 7b is the IR touch screen 500 in FIG. 5b provided with an electrically conductive surface layer 550.

FIG. 8b is cross section of the table top T100 along the section line X-X in FIG. 8a;

DETAILED DESCRIPTION OF PREFERRED EMBODIMENTS OF THE INVENTION

Figure 8A:
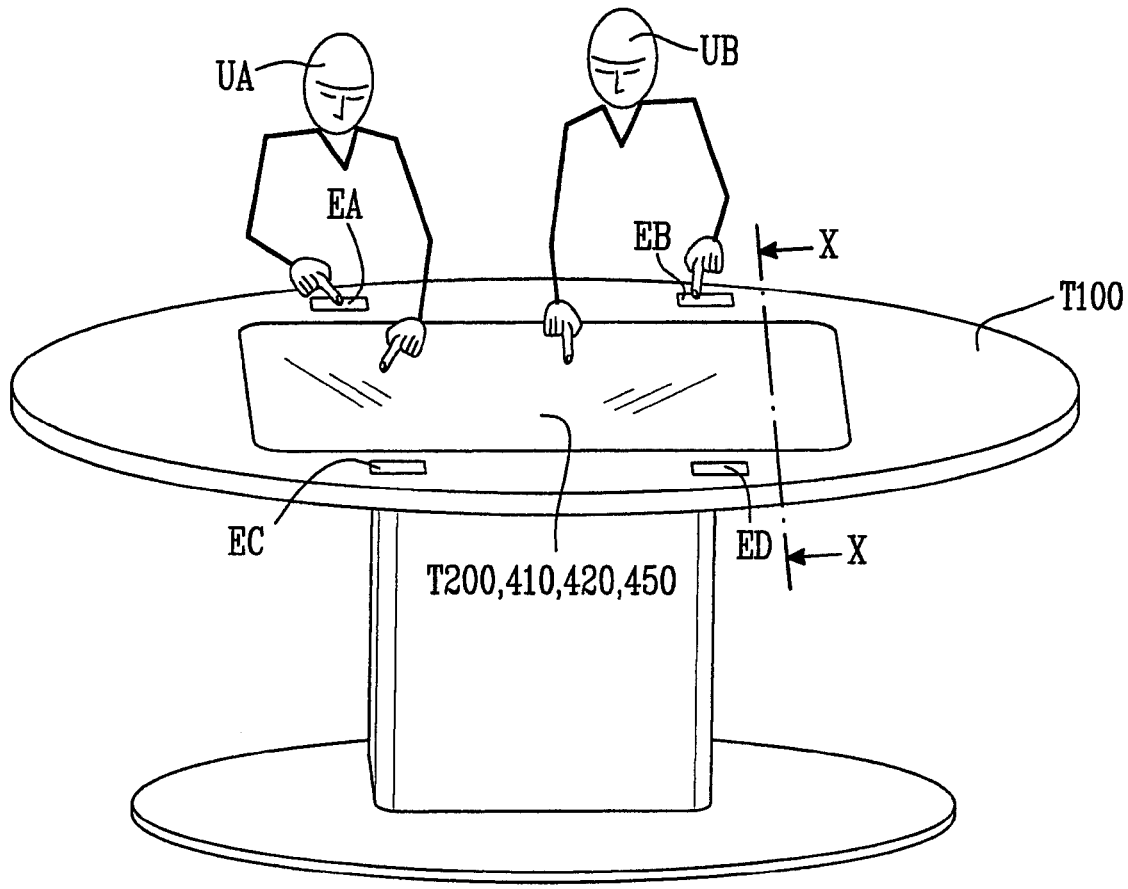
FIG. 8a is a perspective view of a touch table arrangement T1 according to a floor based embodiment of the present invention.

FIG. 1 shows a typical structure of a general touch screen 100. The touch screen 100 comprises a substantially transparent substrate 110, e.g. made of glass, plastic or some other suitable substantially transparent material. Various additional layers of materials and/or units are arranged on top of the substrate 110 to form the touch sensitive elements 120 of the touch screen 100. Typically, the touch sensitive elements 120 include transducers and circuitry that are necessary to detect a touch by a user in a manner that can be used to compute the location of the touch. A cable 130 or similar is connected to the touch screen 100 and in particular to the touch sensitive elements 120 of the touch screen 100 for bringing various signals to and/or from the touch screen 100. Typically, the cable 130 or similar communication means is further connected to an external control unit 140 or similar unit provided with the appropriate hardware and/or software to coordinate the application of various signals to the touch sensitive elements 120 and to perform calculations based on information from the touch sensitive elements 120 in response to touches so as to extract the X and Y coordinates of the touch. The external control unit 140 can be a dedicated control unit or a general personal computer (PC) or some other suitable processing unit or similar unit. The calculations can be performed by means of hardware or software, or a combination thereof.

A touch screen as the general touch screen 100 is usually arranged on the surface of a display unit T200, as will be described below with reference to FIGS. 8a-8b. The control unit 140 in such embodiments is typically connected to both the touch screen 100 and the display unit T200. This enables the control unit 140 to correlate the X and Y coordinates of a touch with an image displayed on the display unit T200, so as to detect and recognise the touch of a certain object in the image displayed by the display unit T200. This is well known technique in connection with various touch systems wherein a touch screen is arranged on the surface of a display unit and the technique need no further explanation.

There are at least four well known and commonly used touch screen technologies that utilize the exemplifying structure of the touch screen 100. These touch screen technologies are: resistive, capacitive, surface acoustic wave (SAW) and infrared (IR). However, other technologies are clearly conceivable, e.g. touch screens provided with a digital camera or similar for continuously recording an image of the surface that is arranged to be touched. The recorded image can e.g. be analyzed by means of image processing for detecting touches on the surface.

FIG. 2a is a schematic top view of a resistive touch screen 200, whereas FIG. 2b is a schematic side view of the resistive touch screen 200, showing as a cross section of the touch screen 200 along the section line A-A in FIG. 2a. The touch sensitive elements 220 of the resistive touch screen 200 includes a lower circuit layer 221; a flexible spacer layer 222 containing a matrix of spacer dots 223; a flexible upper circuit layer 224; and a flexible top protective substrate 225. All of these layers or substrates are transparent. The lower circuit layer 221 often comprises conductive materials deposited on a transparent glass substrate 210 or similar, forming a circuit pattern. An external control unit 240 is connected to the touch screen circuitry via cable 230. Conductors in the cable 230 are connected to the circuitry within the lower circuit layer 221 and the upper circuit layer 224. The external control unit 240 coordinates the application of voltages to the touch screen circuit elements. When the resistive touch screen 200 is pressed by a user of the screen, the pressing object, whether a finger, a stylus, or some other object, deforms the top protective substrate 225, the upper circuit layer 224, and the spacer layer 222, forming a conductive path at the point of the touch between the lower circuit layer 221 and the upper circuit layer 224. A voltage is formed in proportion to the relative resistances in the circuit at the point of touch, and is measured by the external control 240 connected to the other end of the cable 230. The control unit 240 then computes the X and Y coordinates of the point of touch.

FIG. 3a is a schematic top view of a capacitive sensing touch screen 300, whereas FIG. 3b is a schematic side view of the capacitive sensing touch screen 300, shown as a cross section of the touch screen 300 along the section line B-B in FIG. 3a. The touch sensitive elements 320 include a transparent and electrically conductive metal oxide layer 321, formed on a transparent glass substrate 310 or similar, and metal contacts 322, 323, 324, 325 arranged on the conductive metal oxide layer 321 at the corners of the touch screen 300. The metal contacts 322, 323, 324, 325 are connected by circuitry conductors (not shown) in a cable 330, which in turn is connected to an external control unit 340. The external control unit 340 causes voltages to be applied to the metal contacts 322, 323, 324, 325, creating a uniform electric field across the surface of the substrate 310, propagated through the transparent metal oxide layer 321. When a user of the touch screen 300 touches the screen with a finger or some other electrically conductive object, it will capacitively couple with the layer 321 causing a flow of a small current from each corner contact 322, 323, 324, 325 to the location of the touching point. The current flowing from a certain corner contact 322, 323, 324, 325 to the touching point is proportional to the distance from the contact 322, 323, 324, 325 to the touching point. The control unit 940 receives information about the current flowing from each corner contact and uses this information to calculate the X and Y coordinates of the touching point.

FIG. 4a is a schematic top view of a surface acoustic wave (SAW) touch screen 400, whereas FIG. 4b is a schematic side view of the SAW touch screen 400, shown as a cross section of the touch screen 400 along the section line C-C in FIG. 4a. The touch sensitive elements 420 include an arrangement of acoustic transducers 421 and sound wave reflectors 422 formed on the face of a transparent glass substrate 410. The sound wave reflectors 422 are capable of reflecting high frequency sound waves that are transmitted along the surface of the substrate, and are placed in patterns conducive to proper wave reflection. Four acoustic transducers 421 are formed on the substrate 410, which transducers 421 are used to launch and sense sound waves on the substrate surface. A cable 430 is bonded to the substrate 410, and contains conductors (not shown) that connect the acoustic transducers 421 to an external control unit 440. The external control unit 440 applies signals to the acoustic transducers 421, causing high frequency sound waves to be emitted across the substrate 410. When a user of the touch screen 400 touches the substrate 410 with a finger or some other object this will disturb the sound wave field. The transducers 421 detect this disturbance and provide information about the disturbance to the external control unit 440, which uses the information to calculate the X and Y coordinates of the touch.

FIG. 5a is a schematic top view of an IR touch screen 500, whereas FIG. 5b is a schematic side view of the IR touch screen 500, shown as a cross section of the touch screen 500 taken along the section line D-D in FIG. 5a. The touch sensitive elements 520 include an array 521 of photodiodes arranged on two adjacent sides 522, 523 of a rectangular transparent substrate 510, with a corresponding array of photo sensors 524 arranged on the two other adjacent sides 525, 526 of the transparent substrate 510. The diode/sensor pairs 521, 524 establish an optical grid across the screen ant they are connected by means of a cable 530 to an external control unit 540. When a user of the touch screen 500 touches the substrate 510 with a finger or some other object this will disturb the grid and cause drops in the signals. The external control unit 540 receives this information and uses it to calculate the X and Y coordinates of the touch.

Above we have briefly discussed the general structure of typical touch screens including resistive touch screens, capacitive touch screens, SAW touch screens and IR touch screens. However, none of these known touch screens can associate a certain touch with a certain user of the screen . In other words, when the touch screen is simultaneously used by a plurality of users there is no way of distinguish a first user from a second user, i.e. known touch screens treats all touches as originating from a single user or as originating from an unknown user.

However, from the discussion above it is clear that a transparent and electrically conductive layer can be formed on the surface of a transparent substrate or similar. This is particularly common in connection with capacitive touch screens, as is evident from the above described capacitive touch screen 300 comprising a transparent metal oxide layer 321 formed on the surface on a glass substrate 310. Hence, it follows that the glass substrate 410 of the SAW touch screen 400 described above can be provided with a transparent and electrically conductive surface layer 450 in a similar way. This is schematically illustrated in FIGS. 6a-6b. It also follows that the glass substrate 510 of the IR touch screen 500 described above can be provided with a transparent and electrically conductive surface layer 550 in a similar way. This is schematically illustrated in FIGS. 7a-7b.

Before we proceed, it should be emphasised that the glass substrates 310, 410, 510 in the exemplifying touch screens 300, 400, 500 described above can be substituted for substrates made of other materials, e.g. made of a transparent and electrically conductive polymer or some other suitable transparent and electrically conductive material. Since such substrates are electrically conductive they do not need an extra electrically conductive layer—e.g. as the extra electrically conductive layer 321, 450, 550 that is formed on the glass substrates 310, 410, 510—to make the surface of the touch screens 300, 400, 500 electrically conductive. It follows that even the flexible top protective substrate 225 of the resistive touch screen 200 can be made of a transparent, flexible and electrically conductive polymer, so as to make the surface of the touch screen 200 electrically conductive.

As will be apparent in the following, the assignment of a certain touch to a certain user of a touch screen 100, 200, 300, 400, 500 is facilitated by the use of an electrically conductive substrate, or an electrically conductive layer 225, 310, 450, 550 formed on the surface of a substrate 210, 310, 410, 510, or some other suitable electrically conductive surface or similar that is arranged as the area that receives the touches from the users of the touch screen 100, 200, 300, 400, 500, as will be further described below.

FIG. 8a is a perspective view of an exemplifying touch table arrangement T1 according to a floor based embodiment of the present invention. FIG. 8b is a cross section of the table top T100 in the touch table arrangement T1 in FIG. 8a taken along the section line X-X. The table top T100 of the touch table arrangement T1 is preferably provided with a SAW touch screen system comprising a control unit 440 connected to a touch screen 400. In turn, the touch screen comprises a transparent and electrically conductive layer 450, a transparent substrate 410 and touch sensitive elements 420, as described above with reference to FIGS. 4a-4b and 6a-6b. It is preferred that the table top T100 is provided with a display unit T200 arranged beneath the touch screen 400, which is best seen in FIG. 8b. The display unit T200 is preferably a so-called flat screen, e.g. a plasma screen or a LCD screen, or a similar thin screen that has a limited depth, e.g. a depth of preferably less that about 30 cm and more preferably less than about 15 cm and even more preferably less than about 7 cm and most preferably less than about 3 cm. The table top T100 is further provided with a plurality of electrically conductive electrodes EA-ED. The electrodes EA-ED are preferably small plates or similar which are made of metal or some other electrically conductive material and which are preferably arranged on the upper surface of the table top T100. However, electrodes with other shapes arranged in other positions are clearly conceivable, e.g. electrodes arranged on the floor near the table top 100 or in a chair arranged near the table top 100. In addition, FIG. 8a shows two users UA, UB of the touch screen system 400, 410, 420, 450 of the touch table T1. The first user UA is simultaneously touching electrode EA and the touch screen 400, i.e. the touch sensitive elements 420 and the conductive layer 450 of the touch screen 400, which enables a touch identification system 900, 1000 (not shown in FIG. 8a) to distinguish touches made by user UA from touches made by other users, as will be further explained below. The second user UB is similarly touching electrode EB and the touch screen 400 simultaneously.

Figure 8B:
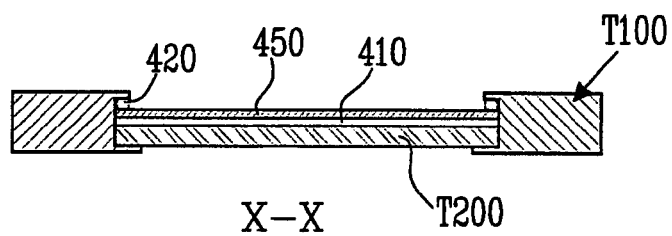
Figure 9:
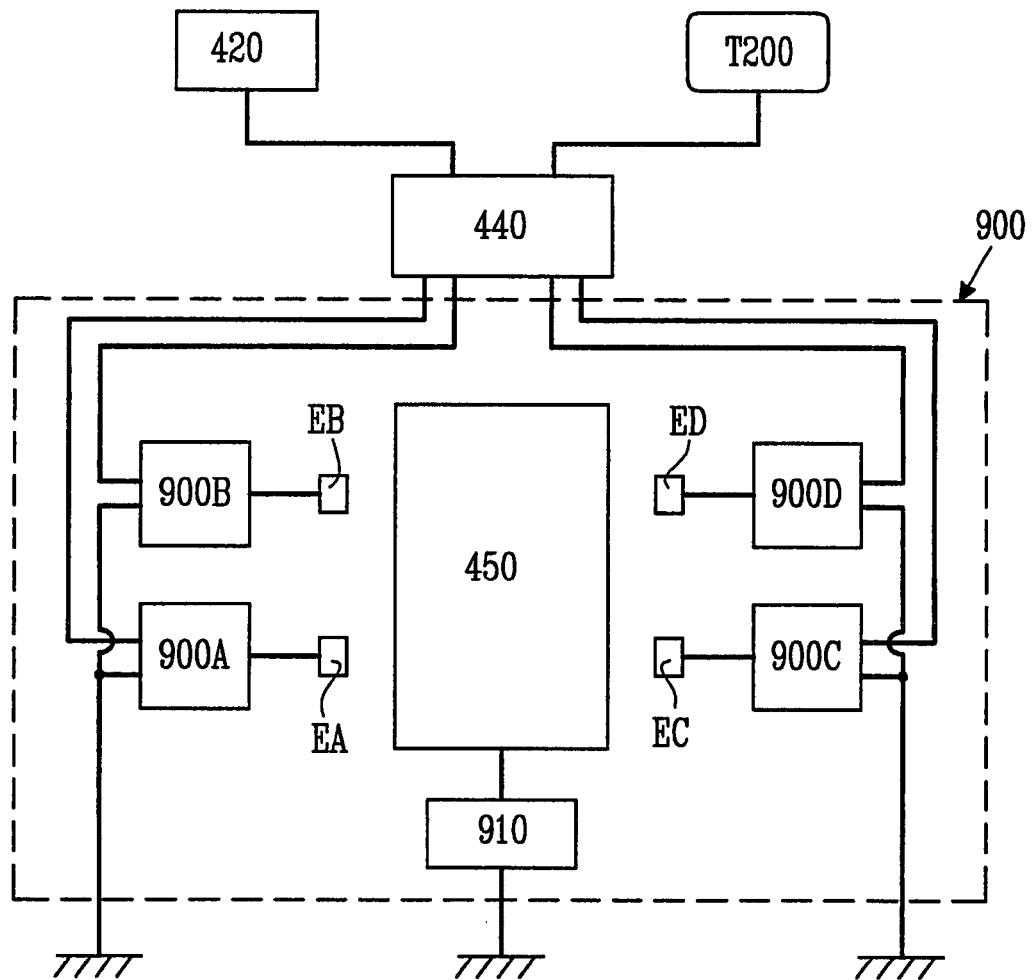
FIG. 9 is a schematic illustration of a first exemplifying identification system 900.

FIG. 9 is a schematic view of a first exemplifying touch identification system 900 comprising an electrically conductive layer 450, which is preferably formed on the surface of the substrate 410 of the touch screen 400 as described above with reference to FIGS. 6a-6b and 8a-8b. In addition, the touch identification system 900 comprises a transmitter 910, a plurality of receivers 900A-900D and a plurality of electrodes EA-ED (c.f. FIG. 8a). The transmitter 910 is connected to the conductive layer 450 and to a ground potential. Each receiver 900A-900D is similarly connected to the same ground potential as the transmitter 910 and to an electrode EA-ED. In particular the receiver 900A is connected to electrode EA, receiver 900B is connected to electrode EB, receiver 900C is connected to electrode EC and receiver 900D is connected to electrode ED. The transmitter 910 in FIG. 9 is preferably transmitting a single signal, in contrast to transmitting several different signals. It is preferred that this signal is a simple carrier frequency of 1000 kHz, 2000 kHz, 3000 kHz, 4000 kHz, 5000 kHz, 6000 kHz, 7000 kHz, 8000 kHz, 9000 kHz, 10000 kHz, 11000 kHz, 12000 kHz, 13000 kHz, 14000 kHz, 15000 kHz, 16000 kHz, 17000 kHz, 18000 kHz, 19000 kHz or 20000 kHz, or any suitable frequency between these frequencies. However, it is clearly conceivable that some embodiments have a transmitter that transmits with a lower or higher carrier frequency or by a scheme that does not use a carrier frequency at all, e.g. utilizing a difference in electrical potential causing a simple direct current or similar, or utilizing a coded or modulated signal, e.g. a frequency, phase and/or code modulated signal. It is also conceivable that some embodiments of the transmitter 910 are transmitting several signals or signal configurations or similar, e.g. several carrier frequencies.

It is further preferred that each receiver 900A-900D is connected to a control unit 440 or similar for providing information to the control unit 440 of the detection of a simultaneous touch of an electrode EA-ED and the conductive layer 450 performed by a certain user UA, UB of the touch screen 400. The control unit 440 can be a dedicated control unit or a personal computer (PC) or some other suitable processing unit or similar. It is further preferred that the control unit 440 is connected to the touch screen 400 for extracting the X and Y coordinates of said touch preformed by said user as described above with reference to FIGS. 4a-4b. The control unit 440 may also be connected to a display unit T200 for correlating the X and Y coordinates of the touch with an image displayed on the display unit T200 to detect and recognise the touch of a certain object in the displayed image, as briefly described above with reference to FIG. 1.

Figure 10:
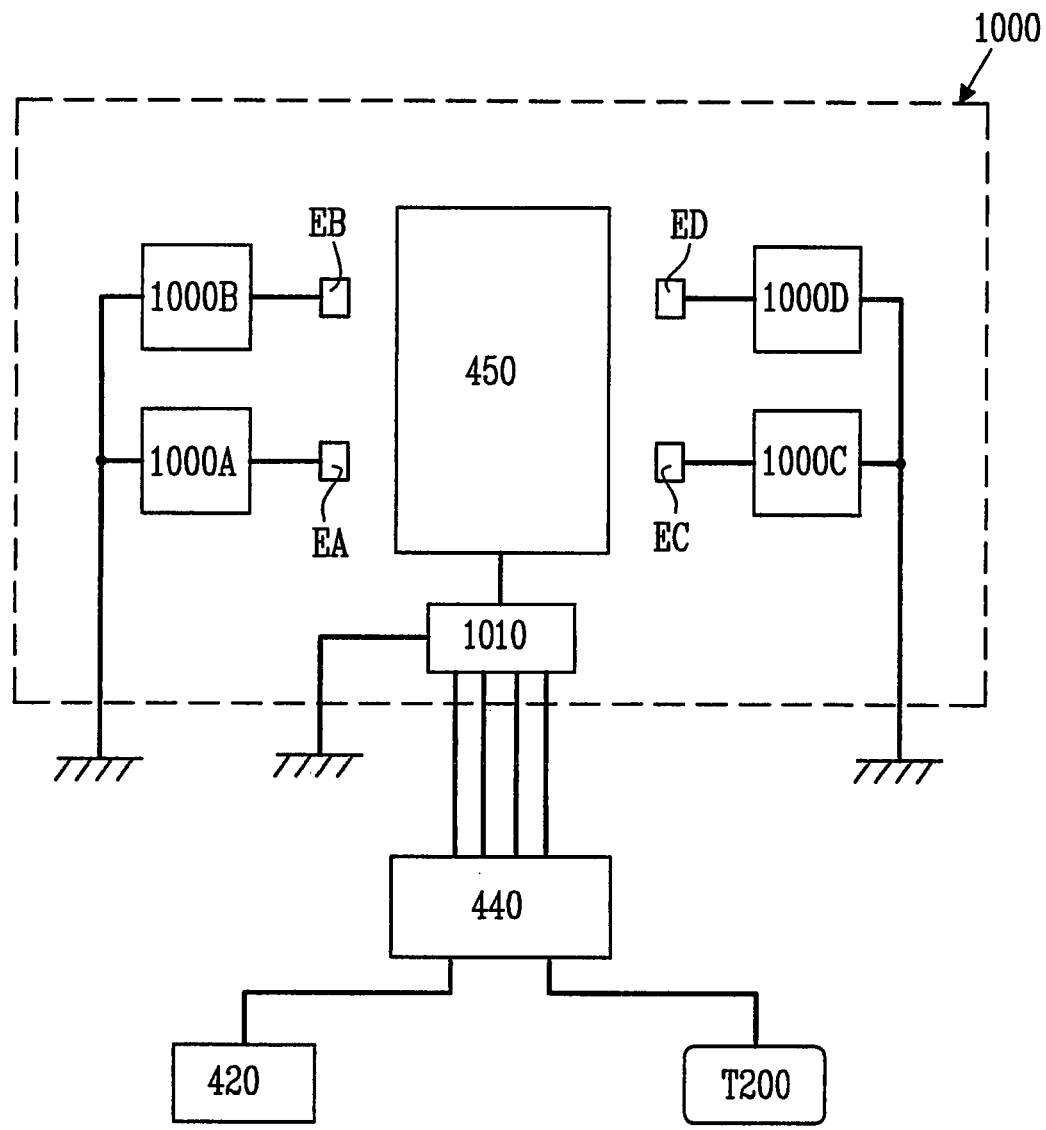
FIG. 10 is a schematic illustration of a second exemplifying identification system 1000.

FIG. 10 is a schematic view of a second exemplifying touch identification system 1000. The second identification system 1000 in FIG. 10 is essentially the same as the first identification system 900 shown in FIG. 9. Hence, the identification system 1000 comprises an electrically conductive layer 450 formed on the surface of the substrate 410 of the touch sensitive screen 400 and a plurality of electrodes EA-ED (c.f.

FIG. 8a). However, the touch identification system 1000 in FIG. 10 comprises a plurality of transmitters 1000A-1000D and preferably onlu one receiver 1010. The receiver 1010 is connected to the electrically conductive layer 450 and to a ground potential. Each transmitter 1000A-1000D is similarly connected to the same ground potential as the receiver 1010 and to an electrode EA-ED. In particular the transmitter 1000A is connected to electrode EA, transmitter 1000B is connected to electrode EB, transmitter 1000C is connected to electrode EC and transmitter 1000D is connected to electrode ED. Each transmitter 1000A-1000D in the identification system 1000 is preferably transmitting a unique signal, e.g. a unique carrier frequency and/or an uniquely modulated signal and/or uniquely encoded signal or similar. This enables the receiver 1010 to detect by means of filtering or decoding or similar that a touch from a certain user UA, UB is present on the conductive layer 450 of the touch table 400.

It is further preferred that the receiver 1010 is connected to a control unit 440 or similar for providing information to the control unit 440 about the detection of a simultaneous touch of an electrode EA-ED and the conductive layer 450 performed by a certain user UA, UB of the touch screen 400. The connection between the receiver 1010 and the control unit may comprise one connection and/or one channel or similar for each transmitter 1000A-1000D. However, other solutions are clearly conceivably, e.g. a message transmitted from the receiver 1010 to the control unit over a data-bus, which message comprises information about possible detections extracted by the receiver 1010. The control unit 440 can be a dedicated control unit or a personal computer (PC) or some other suitable processing unit or similar. It is further preferred that the control unit 440 is connected to the touch screen 400 for extracting the X and Y coordinates of said touch preformed by said user as described above with reference to FIGS. 4a-4b. The control unit 440 may also be connected to a display unit T200 for correlating the X and Y coordinates of the touch with an image displayed on the display unit T200 to detect and recognise the touch of a certain object in the displayed image, as briefly described above with reference to FIG. 1.

When a user UA, UB of the touch table T1 in FIGS. 8a-8b touches one of the electrodes EA-ED and the conductive layer 450 formed on the substrate 410 of the touch screen 400 this will create an electrically conductive path through the body of the user UA, UB, which path electrically connects the touched electrode EA-ED and the touched conductive layer 450 so as to facilitate the detection of the presence of a touch by the user UA, UB in question.

For example, when the user UA in FIG. 8a simultaneously touches electrode EA and the conductive layer 450 of the touch screen 400, electrode EA will be electrically coupled to the conductive layer 450 through the body of the user UA. In the identification system 900 said simultaneous touch by user UA induces a current flow or a similar identifying signal from the transmitter 910 to the conductive layer 450 and further via the body of user UA to the electrode EA and to the receiver 900A and back again to the transmitter 910 via the ground. The receiver 900A can then detect that a touch from user UA is present on the conductive layer 450 of the touch screen 400. However, the particular receiver 900A will not detect touches from other users, e.g. a simultaneous touch of electrode EB and the conductive layer 450 performed by user UB in FIG. 8a. However, this touch will be detected by receiver 900B in the touch identification system 900. Naturally, this applies mutatis mutandis for the other receivers 900C-900D and electrodes EC-ED in the identification system 900.

In the identification system 1000 the above exemplifying simultaneous touch by user UA induces a current flow or a similar identifying signal from the transmitter 1000A to the electrode EA and further via the body of user UA to the conductive layer 450 and to the receiver 1010 and back again to the transmitter 1000A via the ground. Since each transmitter 1000A-1000D in the identification system 1000 is preferably transmitting a unique signal the receiver 1010 can detect, by means of filtering and/or decoding or similar, that a touch from user UA and/or UB is present on the conductive layer 450 of the touch table 400. The uniqueness of the signal from each transmitter 1000A-1000D enables the receiver 1010 to separate touches from different users, e.g. separate a user UA touching electrode EA and the conductive layer 450 from a user UB touching electrode EB and the conductive layer 450. This applies mutatis mutandis for the other transmitters 1000C-1000D and electrodes EC-ED in the identification system 1000.

The presence of a touch from a user UA, UB detected by a receiver 900A-900D, 1010 in a touch identification system 900, 1000 according to an embodiment of the present invention is preferably associated with the position of a touch detected by the touch sensitive elements 420 of the touch screen 400.

A touch detected by a receiver 900A-900D, 1010 and a touch detected by the touch sensitive elements 420 as described above with reference to FIGS. 8-10 can be associated in time. More particularly, a touch that is detected substantially simultaneously by a receiver 900A-900D, 1010 of the touch identification system 900, 1000 and the touch sensitive elements 420 of the touch screen 400 may be associated with a particular user UA, UB. For example, if the receiver 900A-900D, 1010 detects a touch from user UA at the time x and the touch sensitive elements 420 detects the position X, Y of a touch at substantially the same time x, then it can be assumed that the touch is made by user UA.

In addition, a touch detected by a receiver 900A-900D, 1010 and a touch detected by the touch sensitive elements 420 can also be associated with respect to magnitude, i.e. a touch that is detected by a receiver 900A-900D, 1010 and the touch sensitive elements 420 as being performed with substantially the same force and/or covering substantially the same area is associated to the same user. For example, a touch that covers a small area of the conductive layer 450 will create a rather weak electrical path through the body of the user UA, UB connecting the touched electrode EA-ED and the touched conductive layer 450 as described above. A receiver 900A-900D, 1010 will then detect a rather small identifying current or similar transmitted through the body of the user UA, UB. Similarly, a touch that covers a small area of the conductive layer 450 will result in the detection of a rather small signal by the touch sensitive elements 420 arranged on the conductive layer 450. Naturally, the opposite is valid for a touch that covers a large area of the conductive layer 450. Hence, a week signal detected by the touch sensitive elements 420 of the touch screen 400 should therefore be associated with a week signal detected by a receiver 900A-900D 1010 in the touch identification system 900, 1000, whereas a strong signal detected by the touch sensitive elements 420 of the touch screen 400 should be associated with a strong signal detected by an receiver 900A-900D 1010 in the touch identification system 900, 1000. Naturally, an association can be performed with respect to a combination of both time and magnitude for increased accuracy.

The above described association of the presence and the position of a touch can be performed by means of e.g. the external control unit 440 being connected to the touch screen 400 for receiving the X and Y coordinates of the touch and being connected to the identification system 900, 1000 for receiving the timing and magnitude information of the touch. The timing information for a touch detected by the touch screen 400 and the touch identification system 900, 1000 can e.g. be extracted from the time when the control unit 440 receives the relevant information from the touch screen 400 and the touch identification system 900, 1000.

Furthermore, the above described association can be improved in that the transparent and electrically conductive surface 450 of the identification system 900 is divided into sub-areas (not shown) being electrically insulated with respect to each other. Each such sub-area is preferably connected to its own transmitter 910 adapted to transmit its own unique signal, i.e. the number of sub-areas are preferably the same as the number of transmitters 910. Similarly, each receiver 900A-900D is preferably provided with suitable detecting means for detecting each unique signal that can be transmitted from the sub-divided conductive surface 450 when a user simultaneously touches the sub-area and an electrode EA-ED, as described above. This enables the receivers 900A-900D to determine the identity and thereby the position of the sub-area receiving the touch, which position and/or identity can be transmitted to the control unit 440 for further processing. This enables the touch identification system 900 to provide position information in addition to the identification information. This position information can be utilized to resolve ambiguities in the positions detected by the touch screen 400 and the touch sensitive elements 420 therein. Exemplifying position ambiguities are e.g. discussed in the U.S. Pat. No. 6,856,259 (Sharp). The improved resolving gives an improved position quality, which in turn improves the quality of the above described association.

Similarly, the above described association can be improved in that the transparent and electrically conductive surface 450 of the identification system 1000 is divided into sub-areas (not shown) being electrically insulated with respect to each other. Each such sub-area is preferably connected to its own receiver 1010 as previously describe, i.e. the number of sub-areas are preferably the same as the number of receivers 1010. In addition, each receiver 1010 is preferably connected to the external control unit 440, which enables the control unit 440 to determine the identity of the receiver 1010 detecting the touch and thereby the position of the sub-area receiving the touch. This enables the touch identification system 1010 to provide position information in addition to the identification information, which additional position information can be used to resolve ambiguities in the positions detected by the touch screen 400 and the touch sensitive elements 420 therein. The improved resolving gives an improved position quality, which in turn improves the quality of the above described association.

It should be emphasised that the SAW touch screen 400 is used above as an example of a suitable touch screen in connection with the touch identification systems 900 and 1000. However other touch screens may also be used, e.g. such as the resistive touch screen 200 and the control unit 240, the capacitive touch screen 300 and the control unit 340, or the IR touch screen 500 and the control unit 540 or some other suitable touch screen preferably provided with a control unit or similar coupled to the identification system 900, 1000 and the touch screen in question and arranged to extract the position of a touch on the touch screen and further arranged to associate the position with a touch detected by the touch identification systems 900 and 1000.

Figure 11:
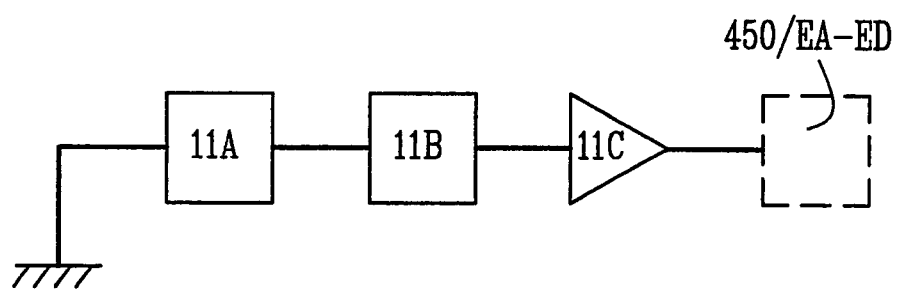
FIG. 11 is a schematic illustration of an exemplifying transmitter.

Referring now to FIG. 11 a transmitter in a touch identification system 900, 1000 according to an embodiment of the present invention typically comprises a signal generator 11A, a modulator 11B and possibly an amplifier 11C. The modulator 11B modulates the signal produced by the signal generator 11A using frequency modulation, amplitude modulation or some other well known and suitable modulation technique. The signal is preferably encoded by the modulator 11B or otherwise provided with a unique identity in accordance with a suitable encoding scheme or similar, e.g. provided with a signal pattern modulated on the signal by the modulator 11B in a well known manner. However, the uniqueness of the signal in some embodiments may be as simple as using a certain carrier frequency, which frequency is preferably determined by the signal generator 11A. The signal may additionally be supplied to the amplifier 11C for amplification before it is provided to the conductive layer 450 in the identification system 900 or an electrode EA-ED in the identification system 1000.

Figure 12:
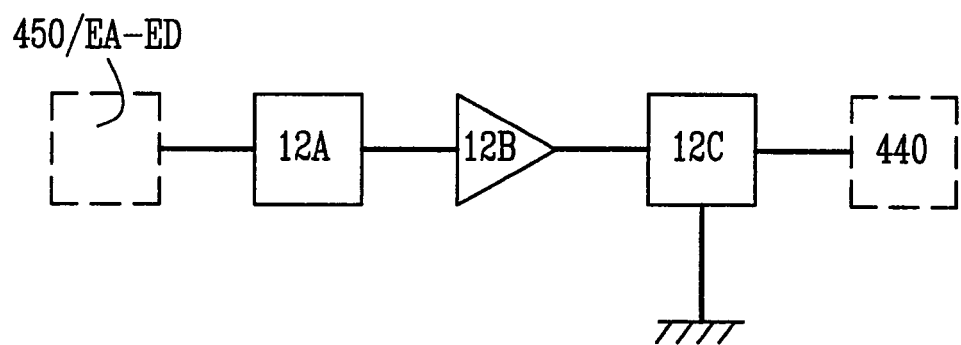
FIG. 12 is a schematic illustration of an exemplifying receiver.

Referring now to FIG. 12 a receiver in a touch identification system 9000, 1000 according to an embodiment of the present invention typically comprises a band-pass filter 12A, an amplifier 12B and a demodulator 12C. Some embodiments of the present invention may not need a band-pass filter 12A. However, the receiver 1010 of the identification system 1000 in FIG. 12 may need a band-pass filter 12A for each electrode EA-ED, e.g. if the transmitters 1000A-1000D are using different carrier frequencies. The band-pass filter 12A, if needed, is followed by an amplifier 12B. The amplifier 12B is adapted to amplify a signal transmitted by a transmitter 910, 1000A-1000D, which signal is received subsequent to its passage between the conductive layer 450 and an electrode EA-ED via the body of a user, e.g. the body of a user UA and UB as described above. The amplified signal is then supplied to the demodulator 12C, which demodulates the signal in a conventional manner depending on the modulation technique used in the transmitter or transmitters of the touch identification system 900, 1000. The demodulated signal can then be analyzed and detected in a conventional manner and it is preferred that the detection of a signal is communicated to a control unit 440 as described above.

The present invention has now been described with reference to exemplifying embodiments and it is clear that a touch on a touch sensitive screen of a touch screen system according to the present invention can be associated with a certain user of the touch screen system However, the invention is not limited to the embodiments described above. On the contrary, other transmitters and receivers are clearly conceivable, e.g. transmitters and receivers similar to the ones used in connection with signaling through the human body as described in the international patent application WO 96/36134. In addition, the receivers 900A-900D in the identification system 900 can be implemented as separate units, each connected to one electrode EA-ED, or as one single unit that is connected to all the electrodes EA-ED. The transmitters in the identification system 1000 can similarly be implemented as single units, each connected to one electrode EA-ED, or as one single unit that is connected to all the electrodes EA-ED in the identification system 1000. Moreover, the electrodes EA-ED in the identification system 900, 1000 can e.g. be implemented in a chair or similar on which a user UA, UB is sitting, or as a metal plate or similar arranged over an area of the floor or similar on which a user UA, UB is standing. The protective glass or plastic layer or similar that is usually arranged in front of ordinary display arrangements such as a CRT screen, a plasma screen or a LCD screen can in some embodiments be used as a substrate similar to the substrates 110, 210, 310, 410, 510 described above.

REFERENCE SIGNS

100 General Touch Screen
110 Transparent Substrate
120 Touch Sensitive Elements
130 Cable
140 External Control Unit
200 Resistive Touch Screen
210 Transparent Substrate
220 Touch Sensitive Element
221 Lower Circuit Layer
222 Flexible Spacer Layer
223 Spacer Dots
224 Flexible Upper Circuit Layer
225 Flexible Top Protective Substrate
230 Cable
240 External Control Unit
300 Capacitive Sensing Touch Screen
310 Transparent Substrate
320 Touch Sensitive Element
321 Metal Oxide Layer
322 Metal Contact
323 Metal Contact
324 Metal Contact
325 Metal Contact
430 Cable
340 External Control Unit
400 Surface Acoustic Wave (SAW) Touch Screen
410 Transparent Substrate
420 Touch Sensitive Element
421 Acoustic Transducers
422 Sound Wave Reflectors
430 Cable
440 External Control Unit
450 Transparent and Electrically Conductive Layer
500 IR Touch Screen
510 Transparent Substrate
520 Touch Sensitive Element
521 Array of Photodiodes
522 First Side of the Substrate
523 Second Side of the Substrate
524 Array of Photo Sensors
525 Third Side of the Substrate
526 Fourth Side of the Substrate
530 Cable
540 External Control Unit
550 Transparent and Electrically Conductive Layer
900 Touch Identification System
900A First Receiver
900B Second Receiver
900C Third Receiver
900D Fourth Receiver
910 Transmitter
920 Detector Arrangement
1000 Touch Identification System
1000A First Transmitter
1000B Second Transmitter
1000C Third Transmitter
1000D Fourth Transmitter
1010 Receiver
1011 Detector Arrangement
EA First Electrode
EB Second Electrode
EC Third Electrode
ED Fourth Electrode
T1 Touch Table Arrangement
T100 Table Top
T200 Display Unit

The invention claimed is:

1. A multi-user touch screen system, comprising:
a touch screen, including,
a transparent and electrically conductive surface configured to receive touches from users of the touch screen system;
touch sensitive elements configured to detect a touch on said transparent and electrically conductive surface to generate a touch signal; and
at least one control unit connected to said touch sensitive elements and configured to detect a position of the touch based on the touch signal; and
a touch identification system, including,
at least two electrodes;
a plurality of transmitting units configured to transmit a plurality of unique identifying signals, each of the at least two electrodes being associated with one of the plurality of transmitting units; and
a receiving unit connected to the transparent and electrically conductive surface and configured to detect said unique identifying signals and said touch signal,
wherein said transmitting units and said receiving unit are arranged with respect to said electrically conductive surface and said at least two electrodes so that said receiving unit detects said unique identifying signals from said transmitting units when a user simultaneously touches the electrically conductive surface and one of the at least two electrodes, and
wherein the receiving unit is configured to receive the unique identifying signals as signals separate from the touch signal.

2. The multi-user touch screen system according to claim 1, wherein said control unit is further connected to the touch identification system and is configured to associate a position of a detected touch on said touch screen with one of the identifying signals.

3. The multi-user touch screen system according to claim 2, wherein said association is based on a time at which said position was detected.

4. The multi-user touch screen system according to claim 1, further comprising: a transparent substrate, wherein said transparent and electrically conductive surface is on an upper surface of said transparent substrate.

5. The multi-user touch screen system according to claim 1, further comprising: a display unit arranged beneath the transparent and electrically conductive surface for presenting moving images to be observed by the users of said touch screen system.

6. The multi-user touch screen system according to claim 1, wherein the transparent and electrically conductive surface is one of a transparent and electrically conductive metal oxide and transparent and electrically conductive polymer.

7. The multi-user touch screen system according to claim 1, wherein the touch sensitive elements are arranged on the transparent and electrically conductive surface.

8. The multi-user touch screen system according to claim 1, wherein the touch screen is one of a resistive touch screen comprising resistive touch sensitive elements, a capacitive touch screen comprising capacitive touch sensitive elements, a SAW touch screen comprising acoustic touch sensitive elements, and an IR touch screen comprising infrared touch sensitive elements.

9. The multi-user touch screen system according to claim 1, wherein the receiver is configured to detect at least one of a voltage, a current, a frequency and an amplitude that is received from a transmitter, the voltage, current, frequency, and amplitude being associated with a body of the user of said touch screen system.

10. A touch table arrangement comprising a table top provided with the multi-user touch screen system according to claim 1.

11. The multi-user touch screen system according to claim 2, wherein said association is based on a magnitude of said touches detected by said touch screen and said touch identification system.

12. The multi-user touch screen system according to claim 3, wherein said association is based on a magnitude of said touches detected by said touch screen and said touch identification system.

13. The multi-user touch screen system according to claim 2, wherein the transparent and electrically conductive surface is divided into sub-areas being electrically insulated with respect to each other, and each of the sub-areas are connected to the receiver, and said association is further based on a position of the touch with respect to the sub-areas.

14. The multi-user touch screen system according to claim 3, wherein the transparent and electrically conductive surface is divided into sub-areas being electrically insulated with respect to each other, and each of the sub-areas are connected to the receiver, and said association is further based on a position of the touch with respect to the sub-areas.

15. The multi-user touch screen system according to claim 4, wherein the transparent and electrically conductive surface is divided into sub-areas being electrically insulated with respect to each other, and each of the sub-areas are connected to the receiver, and said association is further based on a position of the touch with respect to the sub-areas.

16. A multi-user touch screen system, comprising:
a touch screen, including
a transparent and electrically conductive surface configured to conduct at least one identifying signal upon direct contact of a user of the touch screen system with the transparent and electrically conductive surface;
touch sensitive elements configured to detect a touch on said transparent and electrically conductive surface to generate a touch signal;
at least one control unit connected to said touch sensitive elements and configured to detect a position of the touch based on the touch signal; and
a touch identification system, including,
at least two electrodes;
a plurality of transmitting units configured to transmit the identifying signal, each of the at least two electrodes being associated with one of the plurality of transmitting units; and
a receiving unit connected to the transparent and electrically conductive surface and configured to detect the transmitted identifying signal and the touch signal,
wherein said transmitting units and said receiving unit are arranged with respect to said electrically conductive surface and said at least two electrodes so that the receiving unit detects the transmitted identifying signal from the one of the transmitting units when a user simultaneously touches the electrically conductive surface and one of the at least two electrodes, and
wherein the receiving unit is configured to receive the transmitted identifying signal as a signal separate from the touch signal.

17. A multi-user touch screen system, comprising:
a touch screen, including,
a transparent and electrically conductive surface configured to receive touches from users of the touch screen system;
touch sensitive elements configured to detect a touch on said transparent and electrically conductive surface to generate a touch signal; and
at least one control unit connected to said touch sensitive elements and configured to detect a position of the touch based on the touch signal; and
a touch identification system, including,
at least two electrodes;
a plurality of transmitting units configured to transmit a plurality of unique identifying signals, each of the at least two electrodes being associated with one of the plurality of transmitting units; and
a receiving unit connected to said transparent and electrically conductive surface and configured to detect said unique identifying signals and said touch signal,
wherein said transmitting units and said receiving unit are arranged with respect to said electrically conductive surface and said at least two electrodes so that said receiving unit detects said unique identifying signals from said transmitting units when a user simultaneously touches the electrically conductive surface and one of the at least two electrodes,
wherein the unique identifying signals are not the same as the touch signal, and
wherein the transmitting units and the receiving unit are connected to a same ground potential.

\* \* \* \* \*